United States Patent
Nam

(10) Patent No.: US 9,912,230 B2
(45) Date of Patent: Mar. 6, 2018

(54) STATIC VAR COMPENSATOR APPARATUS AND OPERATING METHOD THEREOF

(71) Applicant: LSIS CO., LTD., Anyang-si, Gyeonggi-do (KR)

(72) Inventor: Tae Sik Nam, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/066,960

(22) Filed: Mar. 10, 2016

(65) Prior Publication Data
US 2017/0070135 A1 Mar. 9, 2017

(30) Foreign Application Priority Data
Sep. 8, 2015 (KR) .......................... 10-2015-0127265

(51) Int. Cl.
*H02M 1/42* (2007.01)
*H02J 3/16* (2006.01)
*H02J 3/18* (2006.01)

(52) U.S. Cl.
CPC ............ *H02M 1/4208* (2013.01); *H02J 3/16* (2013.01); *H02J 3/1828* (2013.01); *Y02E 40/12* (2013.01); *Y02E 40/34* (2013.01)

(58) Field of Classification Search
CPC ........... H02M 1/12; H02M 2007/4835; H02M 1/4208; H02J 3/16; H02J 3/18;
(Continued)

(56) References Cited

U.S. PATENT DOCUMENTS 3,864,619 A * 2/1975 Tanaka .................. H02M 7/515
                                                    363/135
3,992,661 A * 11/1976 Kelley, Jr. ............. H02J 3/1864
                                                    323/210
(Continued)

FOREIGN PATENT DOCUMENTS

CN    201048291     4/2008
CN    103475005    12/2013
(Continued)

OTHER PUBLICATIONS

European Patent Office Application Serial No. 16159984.0, Search Report dated Mar. 9, 2017, 11 pages.
(Continued)

*Primary Examiner* — Gustavo Rosario Benitez
(74) *Attorney, Agent, or Firm* — K&L Gates LLP

(57) ABSTRACT

A static Voltage Ampere Voltage Reactive (VAR) comparator including: a plurality of capacitors being in a Y-connected structure and supplying three-phase alternating current power according to a switching operation; a plurality of bidirectional thyristors connected to the plurality of capacitors in serial to open and close the plurality of capacitors; and a controller, in response to power applied to the static VAR compensator, periodically applying a firing pulse signal to the plurality of bidirectional thyristors reaching to a voltage phase on which a transient current is minimized, wherein, at a point in time when first applying the firing pulse signal to one bidirectional thyristor, the controller applies simultaneously applies the firing pulse signal to the one bidirectional thyristor and other remaining bidirectional thyristors allowing a current to flow on three phases.

13 Claims, 13 Drawing Sheets

(58) Field of Classification Search
CPC .. H02J 3/1828; G05F 1/66; G05F 1/67; G05F 1/70; G05F 1/12
See application file for complete search history.

(56) References Cited

U.S. PATENT DOCUMENTS

| | | | | |
|---|---|---|---|---|
| 4,068,159 | A | * | 1/1978 | Gyugyi ................ H02J 3/1864 323/211 |
| 4,156,275 | A | | 5/1979 | Loberg |
| 4,470,005 | A | * | 9/1984 | Gyugyi ................ H02J 3/1864 323/210 |
| 4,680,531 | A | * | 7/1987 | Rey ........................ H02J 3/01 323/206 |
| 5,434,497 | A | * | 7/1995 | Larsen ................. H02J 3/1864 323/209 |
| 5,969,509 | A | * | 10/1999 | Thorvaldsson ........... G05F 1/70 323/210 |
| 2010/0109616 | A1 | * | 5/2010 | Li ........................... G05F 1/70 323/210 |
| 2010/0176769 | A1 | * | 7/2010 | Benchaib ............. H02J 3/1807 323/205 |
| 2011/0316493 | A1 | * | 12/2011 | Thorvaldsson .......... H02J 3/18 323/210 |
| 2014/0009127 | A1 | * | 1/2014 | Mori ........................ G05F 1/70 323/210 |

FOREIGN PATENT DOCUMENTS

| | | |
|---|---|---|
| JP | S5449527 | 4/1979 |
| JP | S6194124 | 5/1986 |
| JP | H0283604 | 3/1990 |
| JP | H06261548 | 9/1994 |
| JP | H07160346 | 6/1995 |
| JP | H08140268 | 5/1996 |
| JP | H11318032 | 11/1999 |
| JP | 2004104930 | 4/2004 |
| JP | 2008011626 | 1/2008 |
| JP | 2012-175834 | 9/2012 |
| KR | 10-1999-0030526 | 3/2000 |
| KR | 10-2005-0070648 | 10/2005 |
| KR | 20-2010-0000808 | 10/2010 |
| KR | 20110035631 | 4/2011 |
| KR | 20140055977 | 5/2014 |

OTHER PUBLICATIONS

Korean Intellectual Property Office Application No. 10-2015-0127265, Notice of Allowance dated Jan. 12, 2017, 2 pages.
Korean Intellectual Property Office Application Serial No. 10-2015-0127265, Office Action dated Oct. 18, 2016, 6 pages.
Japan Patent Office Application No. 2016-075200, Office Action dated Jun. 27, 2017, 2 pages.

* cited by examiner

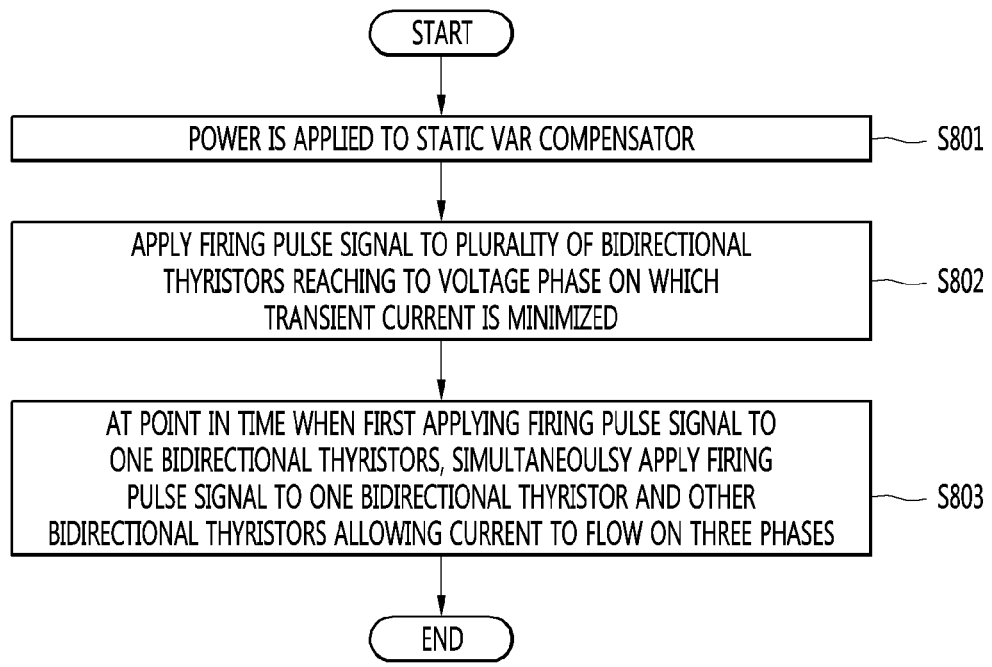

STATIC VAR COMPENSATOR APPARATUS AND OPERATING METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2015-0127265, filed on Sep. 8, 2015, the contents of which are all hereby incorporated by reference herein in their entirety.

BACKGROUND

The present disclosure relates to a static Voltage Ampere Reactive (VAR) compensator and an operating method thereof and, more particularly, to a static VAR compensator and an operating method thereof, which provides a method of generating an initial firing pulse in a Y-connected static VAR compensator.

A Thyristor Switched Capacitor (TSC) is one of various kinds of a static VAR compensator and connected to a receiver front end of a power system to compensate reactive power. Compensation of reactive power is an attempt to maintain power within a specific range desired by a user and transfer more active power. Compensation of reactive power in an alternating current transmission system increases stability and reliability of the system. In particular, long length of a line may improve the effects of reactive power compensation.

FIG. 1 is a diagram illustrating a circuit diagram of connection of a power system and an existing TSC.

An existing TSC 100 is delta-connected to a power system to generate a three-phase alternating current.

In this case, as shown in FIG. 1, the three phases causing the three-phase alternating current to occur may include bidirectional thyristors 110, 120, and 130, respectively, and capacitors 111, 121, and 131, respectively. In addition, the three phases may further include small reactors 112, 122, and 132, respectively.

To execute the TSC 100 which is in an off state, power is applied to the TSC 100. Then, a firing pulse is generated to sequentially switch on the bidirectional thyristors 110, 120, and 130, which are respectively included in the three phases of the TSC 100.

The three phases of the existing TSC 100 are delta-connected. However, due to drawbacks of the delta-connection, efforts have been made to develop a new method of connecting a power system. Furthermore, if the new method is applied, a different method of generating an initial firing pulse also needs to be applied.

SUMMARY

The present disclosure provides a method of generating an initial firing pulse in a case where a connection structure of a static Voltage Ampere Reactive (VAR) compensator is changed to Y connection.

Furthermore, in the case of operating a Y-connected static VAR compensator, the present disclosure provides a method of generating an initial firing pulse, by which the static VAR compensator is enabled to operate immediately when power is applied, while minimizing a transient current caused by generation of the firing pulse.

The objectives of the present disclosure are not limited thereto, and those skilled in the art to which the following proposed embodiments pertain could obviously understand other objectives although they are not mentioned in the following.

According to an embodiment, there is provided a static Voltage Ampere Voltage Reactive (VAR) comparator including: a plurality of capacitors being in a Y-connected structure and supplying three-phase alternating current power according to a switching operation; a plurality of bidirectional thyristors connected to the plurality of capacitors in serial to open and close the plurality of capacitors; and a controller, in response to power applied to the static VAR compensator, periodically applying a firing pulse signal to the plurality of bidirectional thyristors reaching to a voltage phase on which a transient current is minimized, wherein, at a point in time when first applying the firing pulse signal to one bidirectional thyristor, the controller applies simultaneously applies the firing pulse signal to the one bidirectional thyristor and other remaining bidirectional thyristors allowing a current to flow on three phases.

According to an embodiment, there is provided a static Voltage Ampere Reactive (VAR) compensation system including: a thyristor control reactor absorbing reactive power; a Thyristor Switching Capacitor (TSC) comprising a plurality of capacitors being in a Y-connected structure and supplying three-phase alternating current power, and a plurality of bidirectional thyristors opening and closing the capacitors; and a controller, in response to power applied to the TSC, periodically applying a firing pulse signal at a specific phase differential to the bidirectional thyristors reaching a voltage phase on which a transient current is minimized, wherein, at a point in time when first applying the firing pulse signal to one bidirectional thyristor, the controller simultaneously applies the firing pulse signal to the one bidirectional thyristor and other remaining bidirectional thyristors allowing a current to flow on three phases.

According to an embodiment, there is provided an operating method of a static Voltage Ampere Reactive (VAR) compensator configured in a Y-connected three phase structure, the method including: receiving applied power; periodically applying a firing pulse signal at a specific phase differential to a plurality of bidirectional thyristors reaching to a voltage phase on which a transient current is minimized; and at a point in time of first applying the firing pulse signal to one bidirectional thyristor, simultaneously applying the firing pulse signal to the one bidirectional thyristors and other remaining bidirectional thyristors allowing a current to flow on three phases.

BRIEF DESCRIPTION OF THE DRAWINGS

FIG. 8 is a diagram illustrating an operating method of a static VAR compensator according to an embodiment of the present disclosure.

DETAILED DESCRIPTION OF THE EMBODIMENTS

The invention is described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

Terms employed throughout the disclosure have the meanings commonly used in the art, and terms arbitrary selected by the inventor are also used. In the latter case, the meanings thereof are described in detail in the detailed description. Thus, the present disclosure should be understood based on the meanings of the terms. In the following description, the terms "comprises" and/or "comprising" as used herein will be understood to mean that the list following is non-exhaustive and may or may not include any other additional suitable items, for example one or more further component(s), operation(s), procedure(s), and/or element(s) as appropriate.

Figure 2:
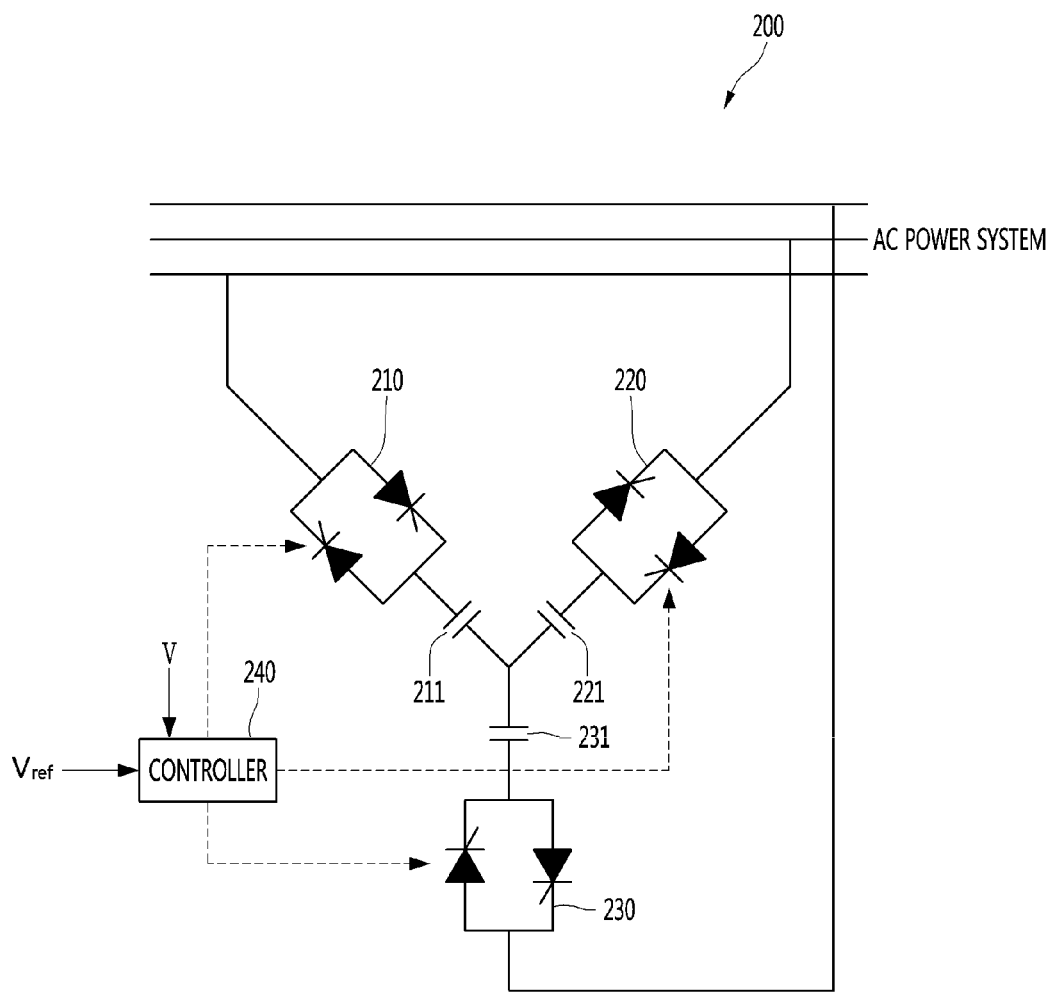
FIG. 2 is a circuit diagram illustrating connection of a power system and a static VAR compensator according to an embodiment of the present disclosure.

FIG. 2 is a diagram illustrating a circuit diagram of connection of a power system and a static voltage ampere reactive (VAR) compensator of according to an embodiment of the present disclosure.

A static VAR compensator 200 according to an embodiment of the present disclosure may be implemented by a Thyristor Switched Capacitor (TSC), and may include a plurality of capacitors 211, 221, and 231, a plurality of bidirectional thyristors 210, 220, and 230, and a controller 240.

The static VAR compensator 200 may be configured in a structure of Y-connected three phases. The Y-connected three phases may cause a three-phase alternating current to occur, and the three phases may include the bidirectional thyristors 210, 220, and 230, respectively, and the capacitors 211, 221, and 321, respectively.

The capacitors 211, 221, and 231 may be Y-connected and supply three phase alternating current power according to a switching operation. For example, the capacitors 211, 221, and 231 may supply power to an AC power system.

Specifically, the Y-connected structure may be a structure in which one end of each of the capacitors 211, 221, and 231 is connected to a neutral point, the other end of each of the capacitors 211, 221, and 231 is connected to one end of each of the bidirectional thyristors 210, 220, and 230, and the other end of each of the bidirectional thyristors 210, 220, and 230 is connected to a power system.

Each of the capacitors 211, 221, and 231 is an element consisting of two electrodes and a dielectric material between the two electrodes, and may store electric energy.

The capacitors 211, 221, and 231 may be a capacitor bank. The capacitor bank is a large-capacity capacitors for accumulating electric energy, which may include a plurality of capacitors.

Opening and closing the capacitors 211, 221, and 231 may be determined by an operation of opening and closing the bidirectional thyristors 210, 220, and 230.

The bidirectional thyristors 210, 220, and 230 are connected to the capacitors 211, 221, and 231 in serial to open and close the capacitors 211, 221, and 231. Specifically, the bidirectional thyristors 210, 220, and 230 are switched on and off by the controller 140 to thereby open and close the capacitors 211, 221, and 231.

The bidirectional thyristors 210, 220, and 230 are switched on and off, thereby allowing a current to flow in two directions. Once a firing pulse signal is applied to a gate of each of the bidirectional thyristors 210, 220, and 230, the bidirectional thyristors 210, 220, and 230 are switched on, and therefore, allows a current to flow.

Each of the bidirectional thyristors 210, 220, and 230 may be in a structure where two thyristors are connected in reverse parallel, and one of the two thyristors may act as a forward thyristor and the other one may act as a reverse thyristor.

According to an embodiment, to minimize the occurrence of a transient current, a forward thyristor may apply a firing pulse signal at a point in time when a voltage phase reaches 270 degree, and a reverse thyristor may apply a firing pulse signal at a point in time when a voltage phase reaches 90 degree. Detailed descriptions thereof are provided with reference with FIG. 3.

Once power is applied to the static VAR compensator 200, the controller 240 periodically applies a firing pulse signal at a phase differential to the bidirectional thyristors 210, 220, and 230 reaching to a voltage phase on which transient current is minimized.

Figure 1:
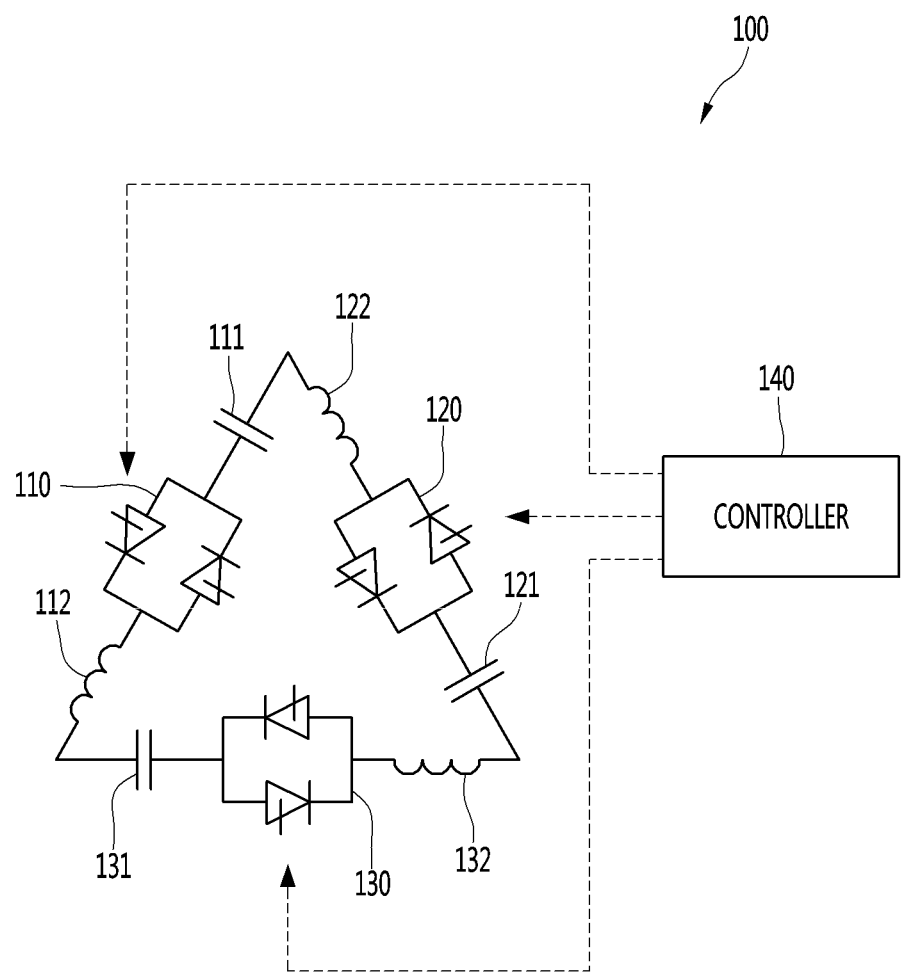
FIG. 1 is a diagram illustrating a circuit diagram of connection of a power system and an existing Thyristor Switching Capacitor (TSC).

As shown in FIG. 1, an existing static VAR compensator 100 is in a delta connection. However, if the Y-connected structure is used, as in the present disclosure, a phase voltage applied to the static VAR compensator 200 may be reduced by 1.73 times less than a phase voltage applied to the existing static VAR compensator which is in a delta-connected structure. Accordingly, an insulating level of the static VAR compensator 200 is reduced so that it is possible to reduce the number of the bidirectional thyristors 210, 220, and 230 included in the static VAR compensator 200, and therefore, to enhance stability of the static VAR compensator 200 and to reduce cost of the static VAR compensator 200.

Once power is applied, the existing static VAR compensator 100 in a delta-connected structure periodically applies a firing pulse signal at a specific phase differential to the bidirectional 210, 220, and 230. In this case, from a point in time when the power is applied, the existing static VAR compensator 100 applies a firing pulse signal at a 120 degree phase differential with respect to each phase.

However, if the existing method of generating a firing pulse signal is employed in the Y-connected static VAR compensator 200, a current path is not generated immediately after an initial firing signal is applied, so that a current does not flow at all in an initial stage.

To solve this problem, in the case of applying an initial firing pulse signal as power is applied, at a point in time when first applying the firing pulse signal to one bidirectional thyristor, the controller 240 may simultaneously apply the firing pulse signal to one bidirectional thyristor and other remaining bidirectional thyristors allowing a current to flow on the three phases.

In one embodiment, one bidirectional thyristor may be a forward thyristor configuring one of the three phases, and the other remaining bidirectional thyristors may be reverse thyristors respectively configuring the other two phases.

In another embodiment, one bidirectional thyristors may be a reverse thyristor configuring one of the three phases, and the other remaining bidirectional thyristors may be forward thyristors respectively configuring the other two phases.

The controller 240 may apply a firing pulse signal to the bidirectional thyristors 210, 220, and 230 on a phase where each voltage applied to the bidirectional thyristors 210, 220, and 230 becomes 0. Accordingly, when power is applied to the static VAR compensator 200, the occurrence of a transient current in the static VAR compensator 200 may be minimized.

A phase on which each voltage applied to the bidirectional thyristors 210, 220, and 230 becomes 0 is a phase on which a capacitor voltage on each phase becomes equal to a maximum system voltage.

Specifically, the controller 240 may apply a firing pulse signal to a forward thyristor at a point in time when a voltage phase reaches 270 degree, and may apply a firing pulse signal to a reverse thyristor at a point in time when a voltage phase reaches 90 degree.

In addition, the controller 240 may perform overall operations for controlling the static VAR compensator 200, including an operation of supplying reactive power. In this case, the controller 240 may compare an input voltage V with a reference voltage Vref, and perform the overall operations based on a result of the comparison.

Figure 3:
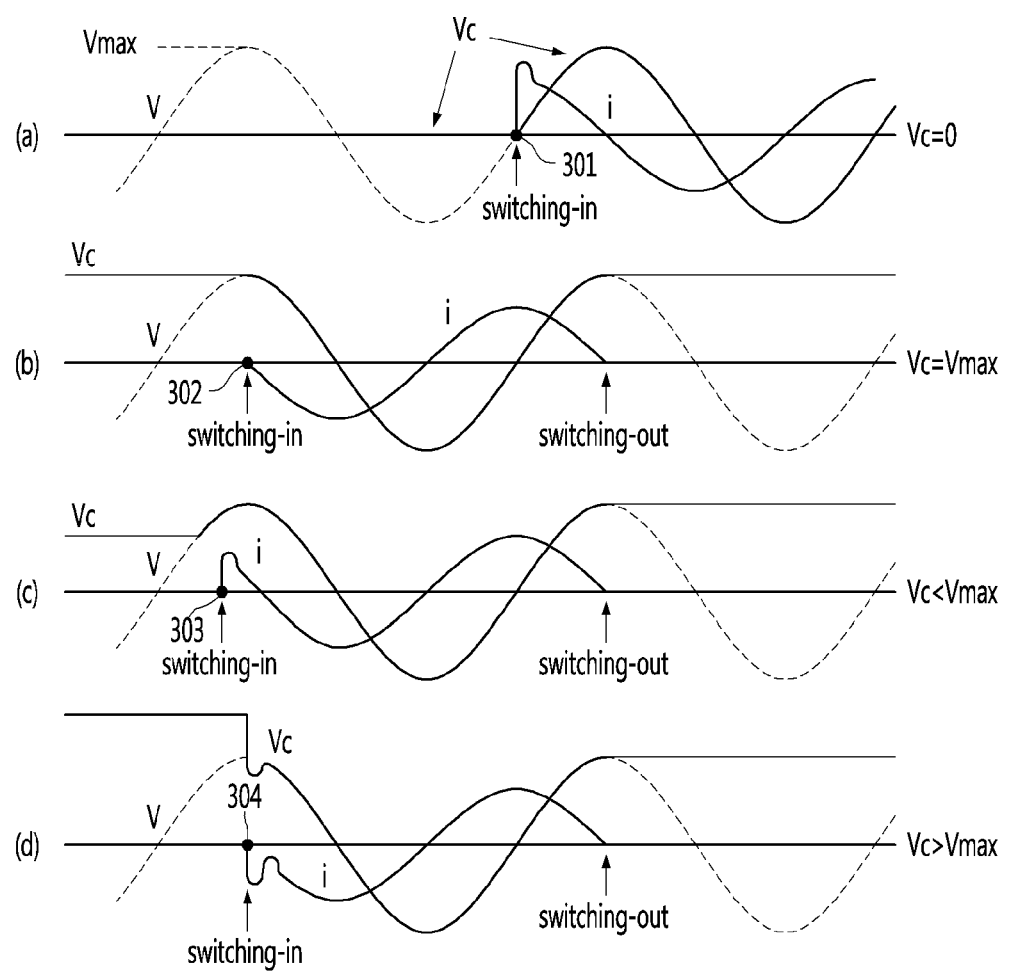
FIG. 3 is a diagram illustrating a method of generating a firing pulse by a static VAR compensator according to an embodiment of the present disclosure.

The controller 240 is included in the static VAR compensator 200 in FIG. 3, but, in another embodiment, the controller may be located outside the static VAR compensator 200 to control the static VAR compensator 200.

Meanwhile, the static VAR compensator 200 may further include a small reactor (not shown). The small reactor (not shown) is included in each of the three phases to limit switching transients or to suppress a harmonic current and an inrush current occurring in a different reactive power compensator or power system which is connected in parallel. In this case, the bidirectional thyristors 210, 220, and 230, the small reactor (not shown), and the capacitors 211, 221, and 231 may be connected in serial.

FIG. 3 is a diagram illustrating a method of generating a firing pulse in a static VAR compensator according to an embodiment of the present disclosure.

A static VAR compensator 200 determines a firing time, and generates and apply a firing pulse based on the determined firing time. Depending on a connection type of three phases and the time of generating the firing pulse, transient phenomena of a current flowing in the static VAR compensator 200 may be different.

The transient phenomena indicates a state where an excessive current instantly flows until a static state in a case where a current is blocked upon turning off power supply to a system or where a current flows upon power application. Thus, in a case where power is applied to the static VAR compensator 300 in the off state, transient phenomena instantly occurs so that a transient current flows and it would compromise stability of the bidirectional thyristors 210, 220, and 230 and the static VAR compensator 200.

Thus, in this embodiment, the time of opening/closing of each of the bidirectional thyristors 210, 220, and 230 is determined considering the transient phenomena of a current, and the bidirectional thyristors 210, 220, and 230 are open and closed based on the determined time. Specifically, by applying a firing pulse signal at a point in time when the transient phenomena may be minimized, the controller 240 switches on each of the bidirectional thyristors 210, 220, and 230.

In the graphs (a), (b), (C), and (d) in FIG. 3, V denotes a system voltage, Vc denotes a capacitor voltage, and Vmax denotes the maximum system voltage.

Switching-in is a point in time when the bidirectional thyristors 210, 220, and 230 are fired to be switched ON, and Switching-out is a point in time when the bidirectional thyristors 210, 220, and 230 are switched OFF. The symbol "i" denotes a current that flows when the bidirectional thyristors 210, 220, and 230 are switched ON.

In the graph (a), each of the bidirectional thyristors 210, 220, and 230 is fired at a point in time when the capacitor voltage Vc is 0 (301).

In the graph (b), each of the bidirectional thyristors 210, 220, and 230 is fired at a point time when the capacitor voltage Vc becomes equal to the maximum system voltage Vmax (302).

In the graph (c), each of the bidirectional thyristors 210, 220, and 230 is fired at a point in time when the capacitor voltage Vc is smaller than the maximum system voltage Vmax (303).

In the graph (d), each of the bidirectional thyristors 210, 220, and 230 is fired at a point in time when the capacitor voltage Vc is greater than the maximum system voltage Vmax (304).

The transient phenomena may be maximized when the capacitor voltage Vc is 0, as shown in the graph (a), when the bidirectional thyristors 210, 220, and 230 are fired when the capacitor voltage Vc is smaller than the maximum system voltage Vmax, as shown in the graph (c), or when the maximum voltage is applied to each of the bidirectional thyristors 210, 220, and 230, as shown in the graph (d).

On the other hand, if the bidirectional thyristors 210, 220, and 230 are fired on a phase on which the capacitor Vc becomes equal to the maximum system voltage Vmax, as shown in the graph (b), a voltage applied to each of the bidirectional thyristors 210, 220, and 230 is 0, so that the transient phenomena of a current may be minimized.

Therefore, a firing pulse signal are applied to the bidirectional thyristors 210, 220, and 230 on a phase where the capacitor voltage Vc becomes equal to the maximum system voltage Vmax, that is, at a point in time when a voltage of each phase is 90 degree or 270 degree. In this case, a firing pulse signal is applied on a phase on which a forward thyristor is at 270 degree and a reverse thyristor is at 90 degree.

Figure 4A:
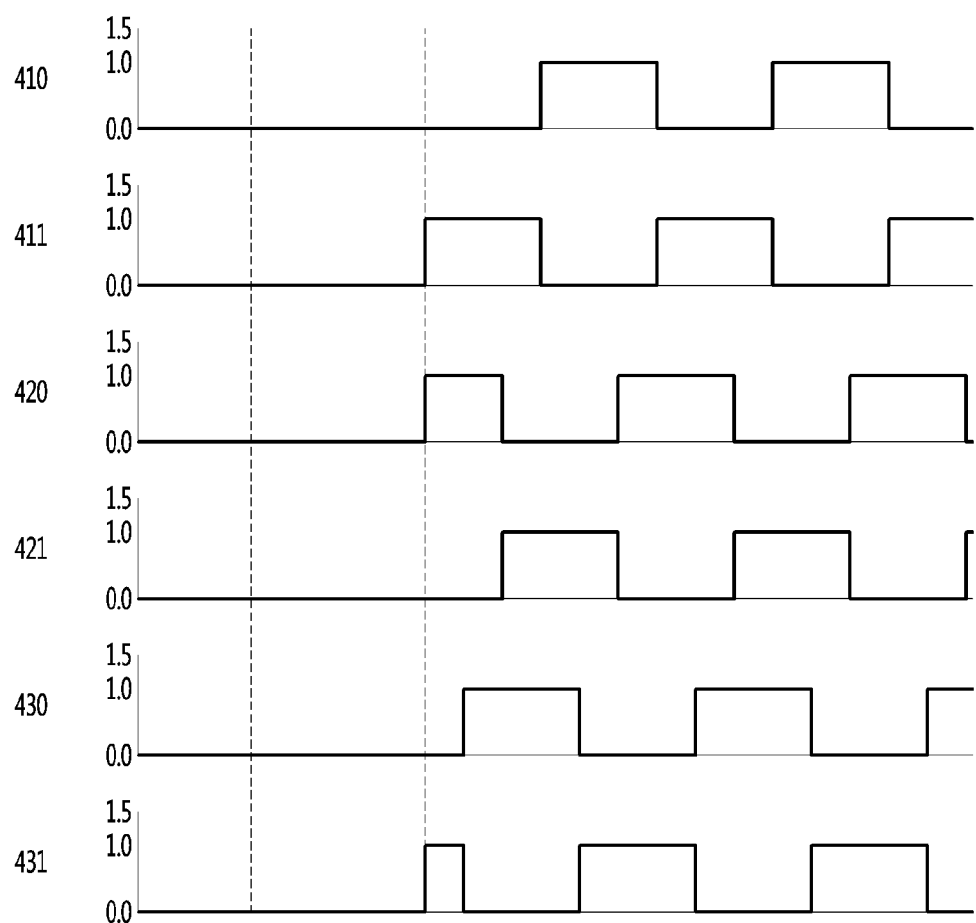
FIGS. 4A to 4B are diagrams illustrating a method of generating a firing pulse by a static VAR compensator according to an embodiment of the present disclosure.
Figure 4B:
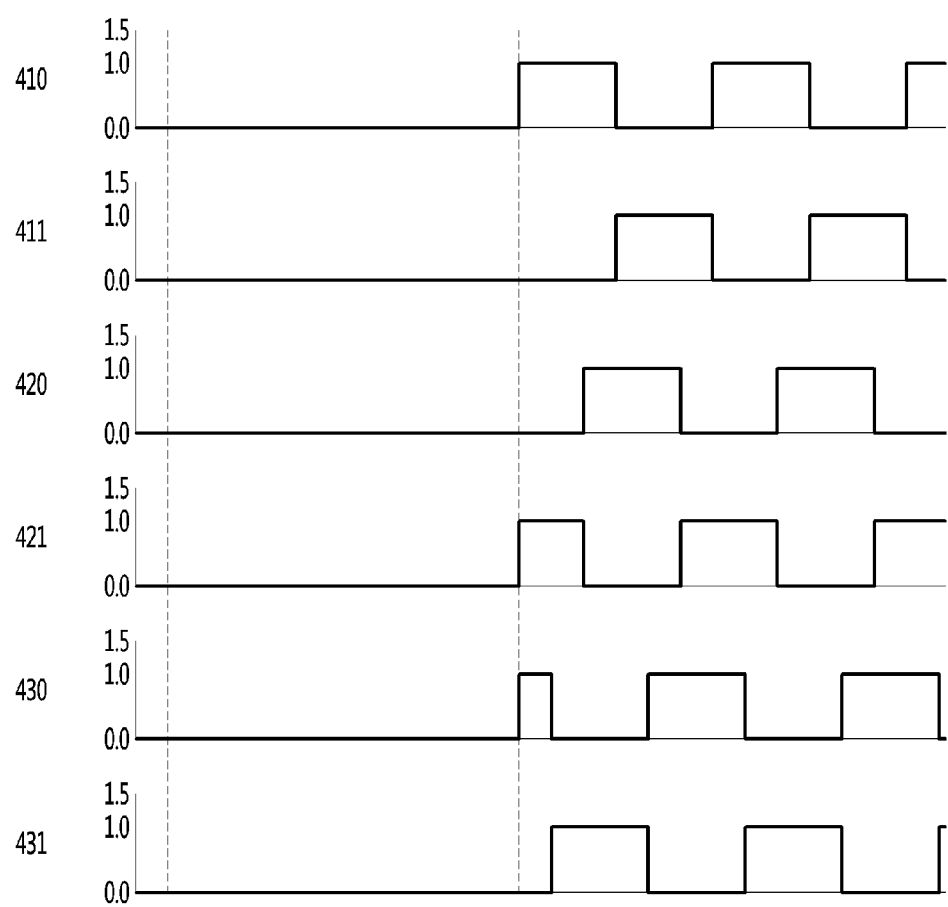

FIGS. 4A to 4B are diagrams illustrating a method of generating a firing pulse in a static VAR compensator according to an embodiment of the present disclosure.

In the case of applying an initial firing pulse signal as power is applied, at a point in time when first applying one bidirectional thyristor, the static VAR compensator 200 according to an embodiment of the present disclosure may simultaneously apply the firing pulse signal to one bidirectional thyristor and other remaining bidirectional thyristors allowing a current to flow on three phases.

According to an embodiment, one bidirectional thyristor is a forward thyristor configuring one of three phases, and the other remaining bidirectional thyristors may be reverse thyristors respectively configuring the other two phases. Detailed descriptions thereof are provided with reference to FIG. 4A.

According to another embodiment, one bidirectional thyristor may be a reverse thyristor configuring one of three phases, and the other remaining bidirectional thyristors may be forward thyristors respectively configuring the other two phases. Detailed descriptions thereof are provided with reference to FIG. 4B.

Hereinafter, a method of applying a firing pulse signal is described in detail.

FIGS. 4A and 4B are diagrams illustrating a case where forward thyristors and reverse thyristors configuring three phases, which are phase A, phase B, and phase C, are switched on and off over time.

In FIGS. 4A and 4B, a graph 410 shows a forward thyristor on phase A, a drawing 411 shows a reverse thyristor on phase A, a graph 420 shows a forward thyristor on phase B, a drawing 421 shows a reverse thyristor on phase B, a graph 430 shows a forward thyristor on phase C, and a graph 431 shows a reverse thyristor on phase C.

In each graph, X axis represents time. In addition, Y axis shows whether a forward thyristor or a reverse thyristor is switched on in accordance with a firing pulse. A thyristor is in an on state in a section where a value of the Y axis is 1, while being in an off state in a section where a value on the Y axis is 0.

Referring to FIG. 4A, a firing pulse signal is periodically applied at a 120 degree phase differential to forward thyristors and reverse thyristors configuring Phase A, Phase B, and Phase C.

With reference to the graph 411, a firing pulse signal is applied to the reverse thyristor on Phase A at a point in time when power is applied. In this case, as shown in the graphs 420 and 431, a firing pulse signal is already applied to the forward thyristor on Phase B and the reverse thyristor on Phase C. However, the reverse thyristor on Phase A is in an off state at a point in time when a firing pulse signal is applied to the forward thyristor on Phase B, and the reverse thyristor on Phase A and the forward thyristor on Phase B are in an off state at a point in time when a firing pulse signal is applied to the reverse thyristor on Phase C, so that a current path is not generated on the three phases. That is, as shown in FIG. 4A, a firing pulse signal are applied to the forward thyristors and reverse thyristors configuring Phase A, Phase B, and Phase C, so that those forward and reverse thyristors are unable to be fired simultaneously, a current path is not generated at a point in time when an initial firing pulse is applied, and, in turn, a current does not flow.

Therefore, in the case of applying an initial firing pulse signal as power is applied, at a point in time when first applying the firing pulse signal to a thyristor on one phase, the static VAR compensator simultaneously applies the firing pulse signal to the thyristor on one phase and thyristors on other phases allowing a current to follow on the three phases.

In FIG. 4A, the thyristor to which the firing pulse signal is first applied when the power is applied is the reverse thyristor on Phase A. In this case, the firing pulse signal is simultaneously applied to the forward thyristor on Phase B and the reverse thyristor on Phase C, so that the above three thyristors are switched on simultaneously to generate a current path, thereby allowing a current to flow on the three phases.

Referring to FIG. 4B, a firing pulse signal is periodically applied at a 120 degree phase differential to forward thyristors and reverse thyristors configuring Phase A, Phase B, and phase C.

With reference to the graph 410, a firing pulse signal is applied to a forward thyristor on Phase A at a point in time when power is applied to a static VAR compensator. In this case, as shown in the graphs 421 and 430, a firing pulse signal is already applied to a reverse thyristor on Phase B and a forward thyristor on Phase C. However, the forward thyristor on Phase A is in an off state at a point in time when the firing pulse signal is applied to the reverse thyristor on Phase B, and the forward thyristor on Phase A and the reverse thyristor on Phase B are in an off state at a point in time when the firing pulse signal is applied to the forward thyristor on Phase C, so that a current path is not generated on the three phases. That is, as shown in FIG. 4B, a firing pulse signal is applied at a specific phase differential to the forward thyristors and reverse thyristors configuring Phase A, Phase B, and Phase C, so that those forward and reverse thyristors is unable to be fired simultaneously, a current path is not generated, and, in turn, a current does not flow.

Therefore, in the case of applying an initial firing pulse signal when power is applied, at a point in time when first applying the firing pulse signal to a thyristor on one phase, the static VAR compensator simultaneously applies a firing pulse signal to the thyristor on one phase and thyristors on other phases allowing a current to flow on the three phases.

In FIG. 4B, the thyristor to which the firing pulse is first applied when the power is applied is the forward thyristor on Phase A. In this case, by simultaneously applying the firing pulse signal to the reverse thyristor on Phase B and the forward thyristor on Phase C, the static VAR compensator simultaneously switches on the three thyristors to generate a current path to thereby allow a current to flow on the three phases.

Figure 5A:
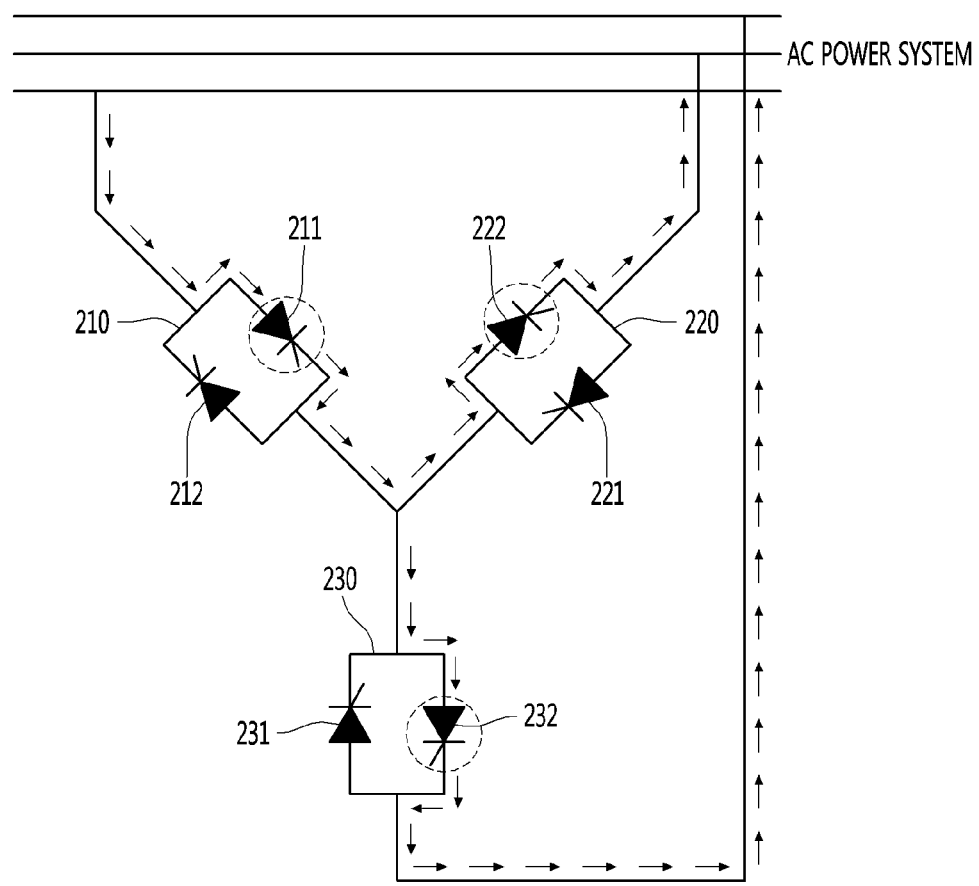
FIGS. 5A to 5C are diagrams illustrating a current path generated due to a method of generating an initial firing pulse according to an embodiment of the present disclosure.
Figure 5B:
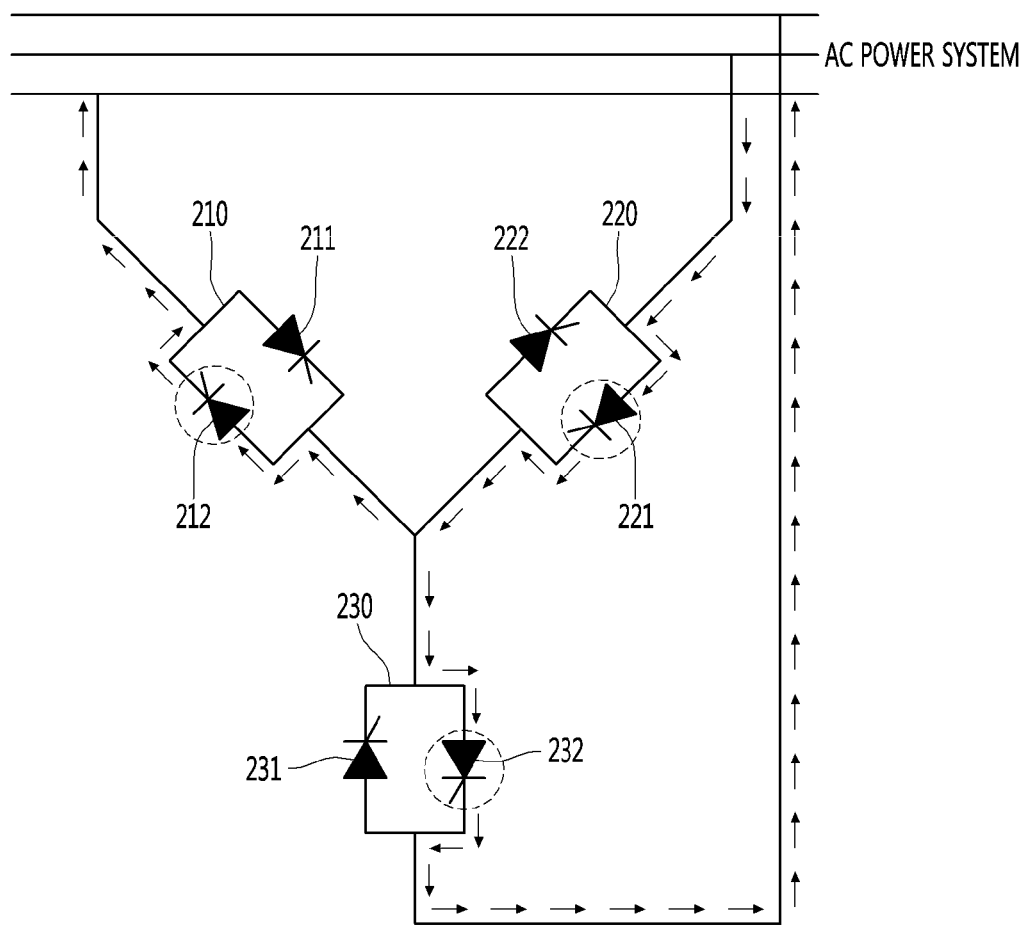
Figure 5C:
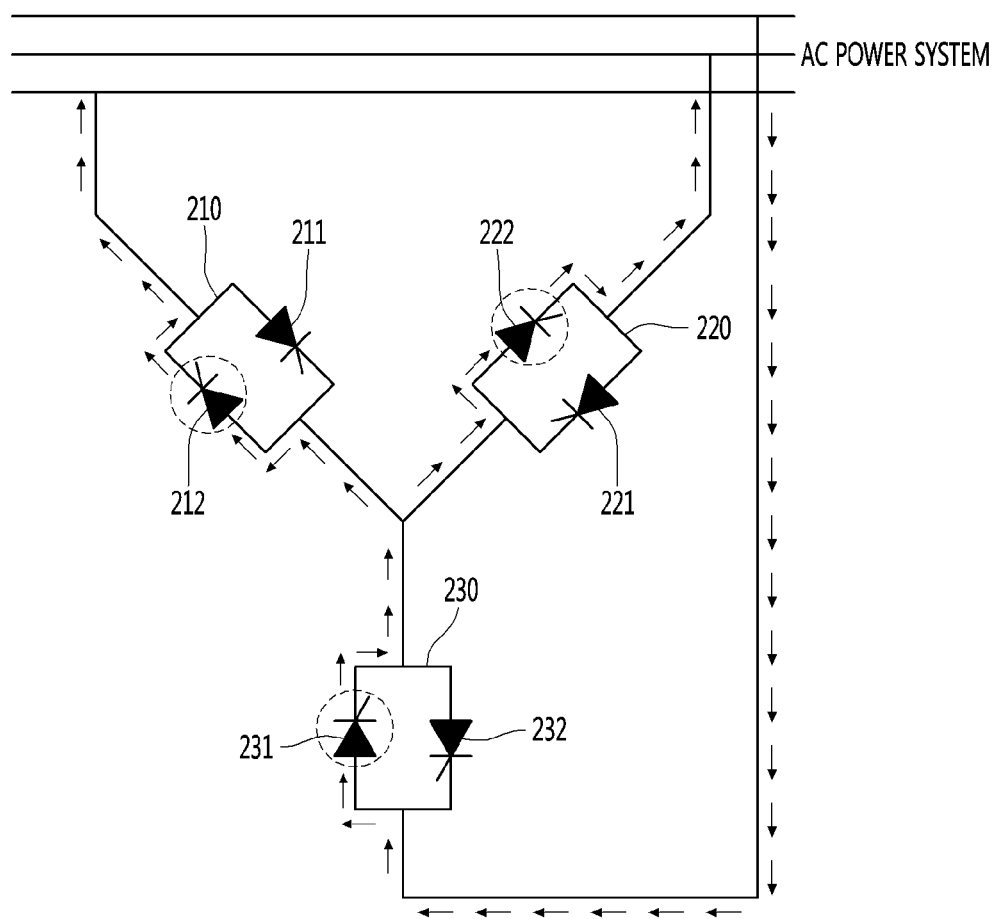

FIGS. 5A and 5C are diagrams illustrating a current path which is generated due to a method of applying an initial firing pulse according to an embodiment of the present disclosure.

In FIGS. 5A to 5C, a static VAR compensator simultaneously fires one forward thyristor configuring one of three phases and two reverse thyristors respectively configuring the other two phases. In this case, there may be possible cases as below:

TABLE 1

| Phase A | Forward | Reverse | Reverse |
| Phase B | Reverse | Forward | Reverse |
| Phase C | Reverse | Reverse | Forward |

In FIGS. 5A to 5C, a bidirectional thyristor 210 on Phase A includes a forward thyristor 211 and a reverse thyristor 212, a bidirectional thyristor 220 on Phase B includes a forward thyristor 221 and a reverse thyristor 222, and a bidirectional thyristor 230 on Phase C includes a forward thyristor 231 and a reverse thyristor 232.

Referring to FIG. 5A, the forward thyristor 211 on Phase A, the reverse thyristor 222 on Phase B, and the reverse thyristor 232 on Phase C are fired simultaneously. In this case, as shown in FIG. 5A, a current path is generated in a direction of an arrow, and accordingly, a current may flow.

Referring to FIG. 5B, the reverse thyristor 212 on Phase A, the forward thyristor 221 on Phase B, and the reverse thyristor 232 on Phase C are fired simultaneously. In this case, as shown in FIG. 5B, a current path is generated in a direction of an arrow, and accordingly, a current may flow.

Referring to FIG. 5C, the reverse thyristor 212 on Phase A, the reverse thyristor 222 on Phase B, and the forward thyristor 231 on Phase C are fired simultaneously. In this case, as shown in FIG. 5C, a current path is generated in a direction of an arrow, and accordingly, a current may flow.

Figure 6A:
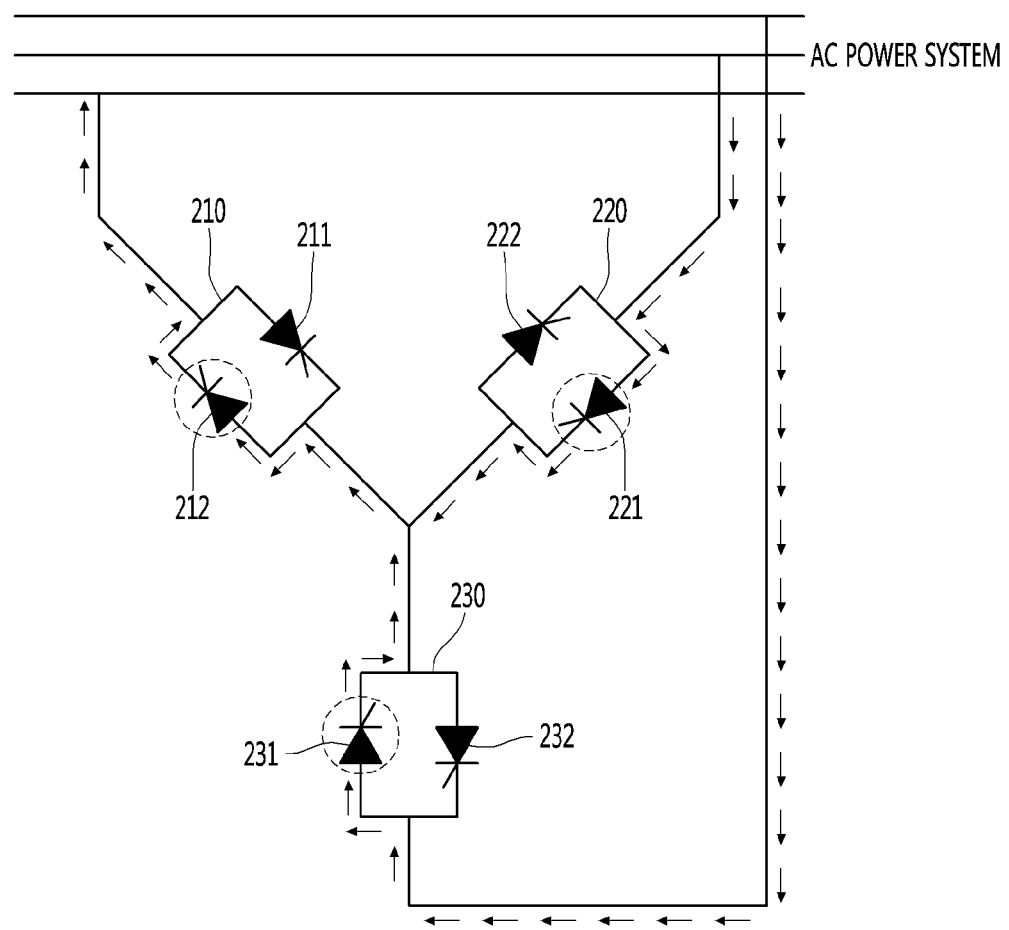
FIGS. 6A to 6C are diagrams illustrating a current path generated due to a method of generating an initial firing pulse according to an embodiment of the present disclosure.
Figure 6B:
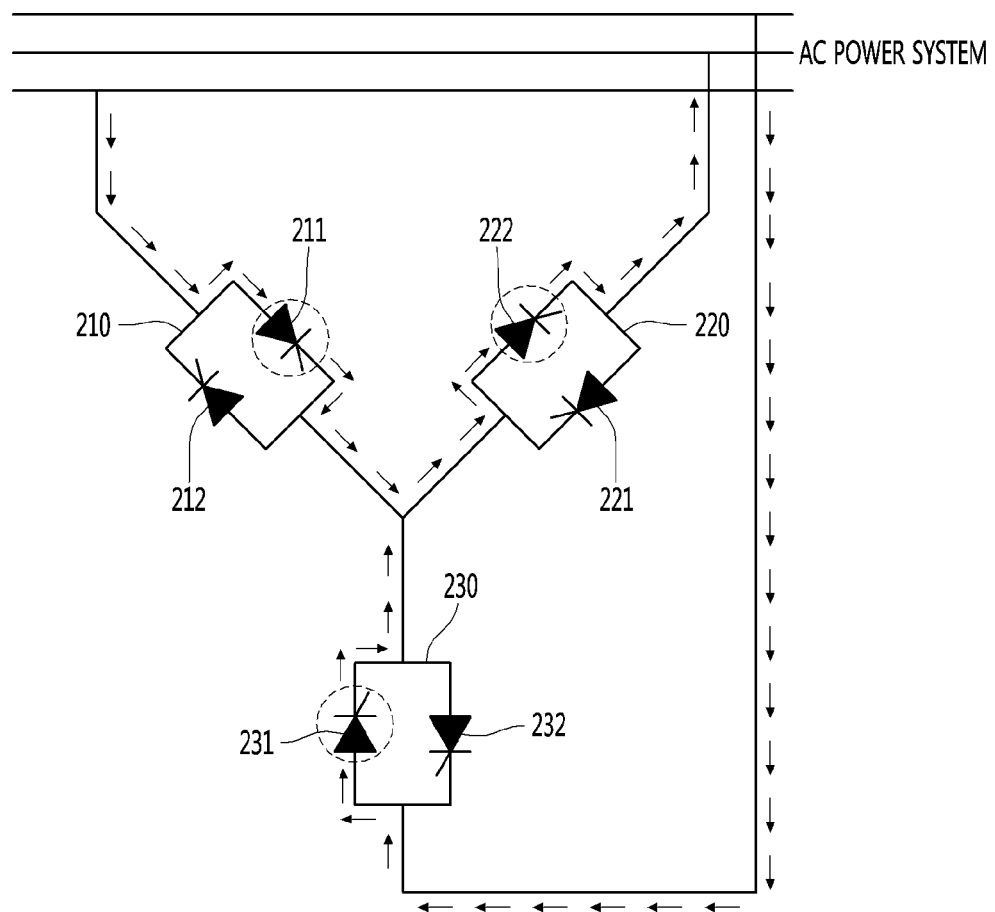
Figure 6C:
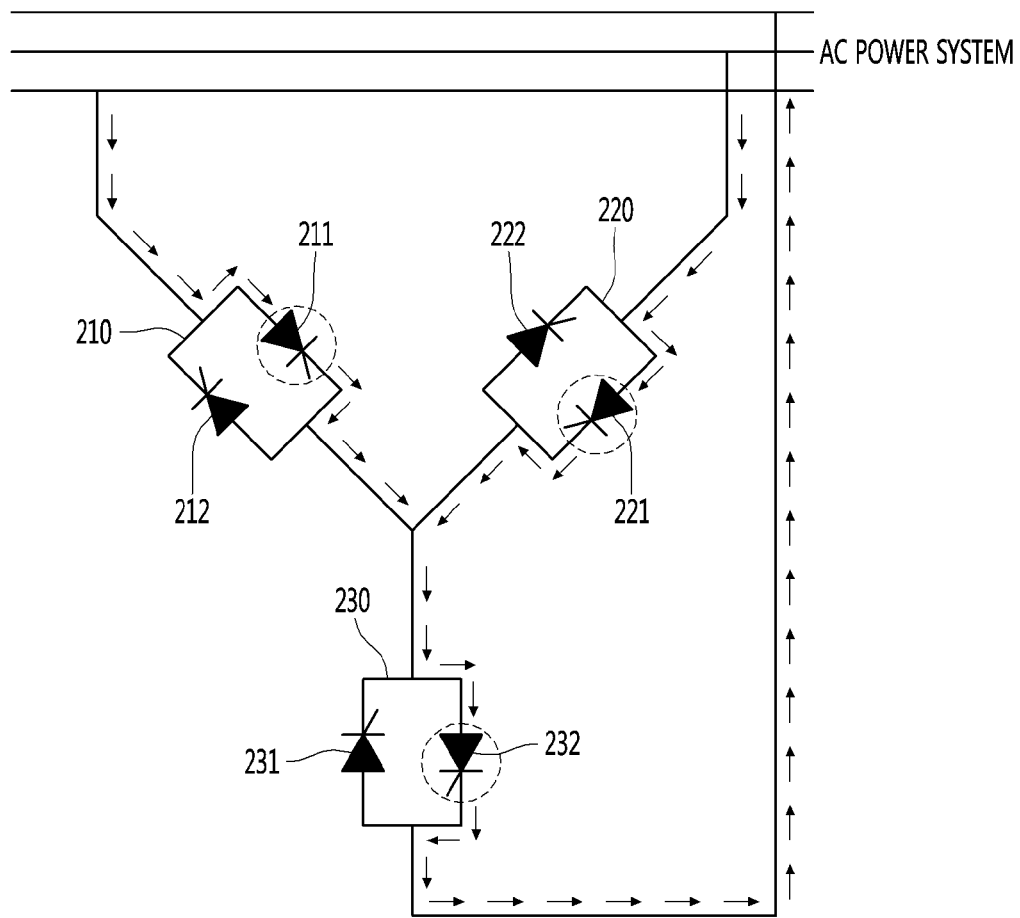

FIGS. 6A to 6C are diagrams illustrating a current path that is generated due to a method of applying an initial firing pulse signal according to an embodiment of the present disclosure.

In FIGS. 6A to 6C, a static VAR compensator simultaneously fires one reverse thyristor configuring one of three phases and two forward thyristors respectively configuring the other two phases. In this case, there may be possible cases as below:

TABLE 2

| Phase A | Reverse | Forward | Forward |
|---------|---------|---------|---------|
| Phase B | Forward | Reverse | Forward |
| Phase C | Forward | Forward | Reverse |

Elements shown in FIGS. 6A to 6C are the same as those shown in FIGS. 5A to 5C. Thus, descriptions about the elements shown in FIGS. 6A to 6C are omitted.

Referring to FIG. 6A, the reverse thyristor 212 on Phase A, the forward thyristor 221 on Phase B, and the forward thyristor 231 on Phase C are fired simultaneously. In this case, as shown in FIG. 6A, a current path is generated in a direction of an arrow, and accordingly, a current may flow.

Referring to FIG. 6B, the forward thyristor 211 on Phase A, the reverse thyristor 222 on Phase B, and the forward thyristor 231 on Phase C are fired simultaneously. In this case, as shown in FIG. 6B, a current path is generated in a direction of an arrow, and accordingly, and a current may flow.

Referring to FIG. 6C, the forward thyristor 211 on Phase A, the forward thyristor 221 on Phase B, and the reverse thyristor 232 on Phase C are fired simultaneously. In this case, as shown in FIG. 6C, a current path is generated in a direction of an arrow, and accordingly, a current may flow.

Figure 7:
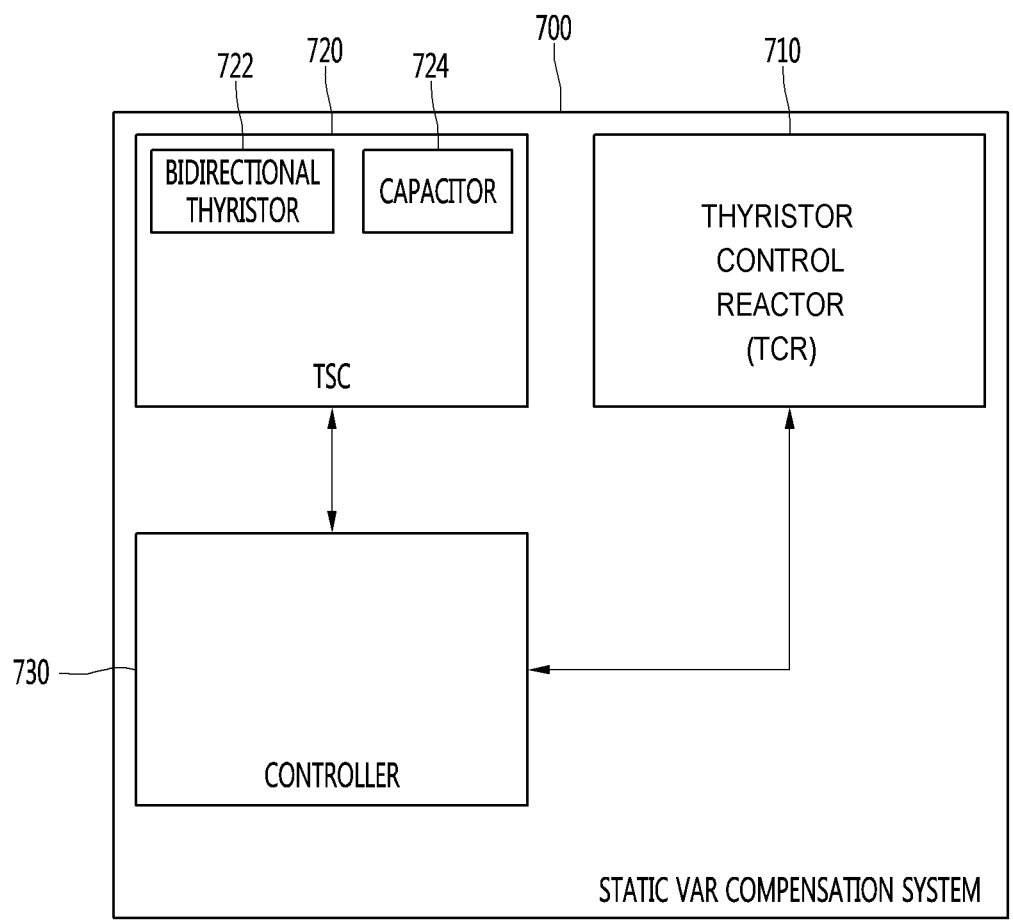
FIG. 7 is a diagram illustrating a configuration of a static VAR compensation system according to an embodiment of the present disclosure.

FIG. 7 is a diagram illustrating a static VAR compensation system according to an embodiment of the present disclosure.

A static VAR compensation system 700 according to an embodiment of the present disclosure may be embodied as an SVC system. The SVC system may be connected to a line in parallel, and may generate or absorb reactive power by opening and closing a capacitor or a combination of a capacitor and a reactor at high speed by means of a thyristor. To this end, the static VAR compensation system 700 may include a Thyristor Controlled Reactor (TCR) 710, a Thyristor Switched Capacitor (TSC) 720, and a controller 730.

The TCR 710 includes a bidirectional thyristor and a reactor, and switches on and off the bidirectional thyristor to absorb reactive power of an AC power system. Specifically, if reactive power transferred from a power system is greater than a specific level, the TCR 710 may absorb an amount of reactive power exceeding the specific level.

The TSC 720 is a three-phase assembly and may be Y-connected to the power system.

The TSC 720 opens and closes a capacitor 724 by switching on and off a thyristor, thereby supplying reactive power to an AC power system. Specifically, if reactive power transferred from the power system is smaller than a specific level, the TSC 720 may supply an amount of reactive power falling short of the specific level. To this end, the TSC 720 may include a plurality of bidirectional thyristors 722 configuring three phases and a plurality of capacitors 724.

In addition, the TSC 720 may further include a small reactor (not shown). The small reactor is used to limit switching transients and to suppress a harmonic current and an inrush current occurring in a different reactive power compensator or power system which is connected in parallel.

In the case of applying an initial firing pulse signal to the TSC 720 as power is applied to the static VAR compensation system 700, at a point in time when first applying the firing pulse signal to one bidirectional thyristor 722, the controller 730 may simultaneously apply the firing pulse signal to one bidirectional thyristor 722 and other remaining bidirectional thyristors 722 allowing a current to flow. Detailed descriptions thereof are already provided in the above, so they are hereinafter omitted.

On a phase where a voltage applied to the bidirectional thyristors 722 becomes 0, the controller 730 may apply a firing pulse signal to each of the bidirectional thyristors 722. Accordingly, when power is applied to the static VAR compensation system 700, a transient current occurring in the TSC 720 may be minimized.

Meanwhile, the controller 730 may perform overall operations for controlling the static VAR compensation system 700, including an operation of controlling supply of reactive power. In this case, the controller 730 may compare an input voltage V with a reference voltage Vref, and perform the overall operations based on a result of the comparison.

In the static VAR compensation system 700, a firing pulse signal is applied when a voltage of each phase is 90 degree (from a reverse thyristor) or 270 degree (from a forward thyristor), so that the transient phenomena of a current may be minimized. In addition, a current are caused to simultaneously flow on three phases when an initial firing signal is applied to thyristors, so that a current path is generated and thus it is possible to control operations of the system once power is applied to the system.

FIG. 8 is a diagram illustrating an operating method of a static VAR compensator according to an embodiment of the present disclosure.

In FIG. 8, a static VAR compensator 200 is in a structure of Y-connected three phases.

Power is applied to the static VAR compensator 200 (S801).

The static VAR compensator 200 periodically applies a firing pulse signal at a specific phase differential to a plurality of bidirectional thyristors reaching to a voltage phase on which a transient current is minimized (S802).

In this case, at a point in time when first applying the firing pulse signal to one bidirectional thyristor, the static VAR compensator 200 simultaneously applies the firing pulse signal to one bidirectional thyristor and other remaining bidirectional thyristors allowing a current to flow on three phases (S803).

Specifically, the static VAR compensator 200 applies the firing pulse signal when a voltage of each phase is 90 degree (from a reverse thyristor) or 270 degree (from a forward thyristor), and, in a case of generating an initial firing pulse signal, the static VAR compensator 200 simultaneously switches on three thyristors, which consist of one thyristor on each phase among six thyristors (a forward thyristor and a reverse thyristor on Phase A, a forward thyristor and a reverse thyristor on Phase B, and a forward thyristor and a reverse thyristor on Phase C), in order to generate a current path.

In this case, the current path may be generated only when two reverse thyristor and one forward thyristor are switched ON or when one reverse thyristor and two forward thyristors are switched ON.

Meanwhile, after generating the current path by generating the initial firing pulse signal, the static VAR compensator 200 periodically switches on thyristors on each phase in sequence in the same manner of the existing method of generating a firing pulse signal.

According to embodiments of the present disclosure, in the case of operating a Y-connected static VAR compensator, transient phenomena of a current which may occur when power is applied may be minimized. In addition, once an initial firing signal is applied, a current path is generated, so that it is possible to operate the static VAR compensator immediately after the power is applied.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A static Voltage Ampere Reactive (VAR) compensator comprising:
   a plurality of capacitors being in a Y-connected structure and configured to supply three-phase alternating current (AC) power according to a switching operation;
   a plurality of bidirectional thyristors connected to the plurality of capacitors in series to couple and uncouple the plurality of capacitors; and
   a controller configured to periodically apply, in response to power applied to the static VAR compensator, a firing pulse signal to the plurality of bidirectional thyristors at a voltage phase on which a transient current is minimized,
   wherein, when the firing pulse signal is first applied to one bidirectional thyristor, the controller is further configured to simultaneously apply the firing pulse signal to the one bidirectional thyristor and other remaining bidirectional thyristors of the plurality of bidirectional thyristors to allow a current to flow on three phases, and
   wherein the voltage phase on which the transient current is minimized is a phase at which a voltage of a capacitor at each of the three phases becomes equal to a maximum voltage of an AC power system coupled to the VAR compensator.

2. The static VAR compensator of claim 1, wherein each of the plurality of bidirectional thyristors comprises a forward thyristor and a reverse thyristor, and the forward thyristor and the reverse thyristor are switched on and off to allow the current to flow in two directions.

3. The static VAR compensator of claim 2, wherein the one bidirectional thyristor is a forward thyristor configuring one of the three phases, and the other remaining bidirectional thyristors are reverse thyristors respectively configuring the rest of the three phases.

4. The static VAR compensator of claim 2, wherein the one bidirectional thyristor is a reverse thyristor configuring one of the three phases, and the other remaining the bidirectional thyristors are forward thyristors respectively configuring the rest of the three phases.

5. The static VAR compensator of claim 2, wherein the controller is further configured to:
   apply the firing pulse signal to the forward thyristors when the voltage phase reaches 270 degrees; and
   apply the firing pulse signal to the reverse thyristors when the voltage phase reaches 90 degrees.

6. The static VAR compensator of claim 1, wherein in the Y-connected structure:
   one end of each of the capacitors is connected to a neutral point;
   the other end of each of the capacitors is respectively connected to one end of each of the plurality of bidirectional thyristors; and
   the other end of each of the plurality of bidirectional thyristors is connected to the AC power system.

7. A static Voltage Ampere Reactive (VAR) compensation system comprising:
   a thyristor control reactor configured to absorb reactive power;
   a Thyristor Switching Capacitor (TSC) comprising:
   a plurality of capacitors in a Y-connected structure and configured to supply three-phase alternating current (AC) power; and
   a plurality of bidirectional thyristors configured to couple and uncouple the plurality of capacitors; and
   a controller configured to periodically apply, in response to power applied to the TSC, a firing pulse signal at a specific phase differential to the bidirectional thyristors at a voltage phase on which a transient current is minimized,
   wherein, when the firing pulse signal is first applied to one bidirectional thyristor, the controller is further configured to simultaneously apply the firing pulse signal to the one bidirectional thyristor and other remaining bidirectional thyristors of the plurality of bidirectional thyristors to allow a current to flow on three phases, and
   wherein the voltage phase on which the transient current is minimized is a phase at which a voltage of a capacitor at each of the three phases becomes equal to a maximum voltage of an AC power system connected to the VAR compensation system.

8. An operating method of a static Voltage Ampere Reactive (VAR) compensator configured in a Y-connected three phase structure, the method comprising:
   receiving applied power;
   periodically applying a firing pulse signal at a specific phase differential to a plurality of bidirectional thyristors at a voltage phase on which a transient current is minimized; and
   when the firing pulse signal is first applied to one bidirectional thyristor, simultaneously applying the firing pulse signal to the one bidirectional thyristor and other remaining bidirectional thyristors of the plurality of thyristors to allow a current to flow on three phases,
   wherein the voltage phase on which the transient current is minimized is a phase at which a voltage of a capacitor at each of the three phases becomes equal to a maximum voltage of an alternating current (AC) power system coupled to the VAR compensator.

9. The operating method of claim 8, wherein each of the plurality of bidirectional thyristors comprises a forward thyristor and a reverse thyristor, and the forward thyristor and the reverse thyristor are switched on and off to allow the current to flow in two directions.

10. The operating method of claim 9, wherein the one bidirectional thyristor is a forward thyristor configuring one of the three phases, and the other remaining bidirectional thyristors are reverse thyristors respectively configuring the rest of the three phases.

11. The operating method of claim 9, wherein the one bidirectional thyristor is a reverse thyristor configuring one of the three phases, and the other remaining bidirectional thyristors are forward thyristors respectively configuring the rest of the three phases.

12. The operating method of claim 9, wherein the firing pulse signal is applied to the forward thyristor when the voltage phase reaches 270 degrees, and the firing pulse signal is applied to the reverse thyristor when the voltage phase reaches 90 degrees.

13. The operating method of claim 8, wherein in the Y-connected structure:
   one end of each of the capacitors is connected to a neutral point;
   the other end of each of the capacitors is respectively connected to one end of each of the plurality of bidirectional thyristors; and
   the other end of each of the plurality of bidirectional thyristors is connected to the AC power system.

\* \* \* \* \*